US007693666B2

(12) United States Patent
Griffith et al.

(10) Patent No.: US 7,693,666 B2
(45) Date of Patent: Apr. 6, 2010

(54) METHOD, SYSTEM, AND PROGRAM PRODUCT FOR CONTROLLING CHEMICAL REACTIONS IN A DIGITAL MICROFLUIDIC SYSTEM

(75) Inventors: Eric Griffith, Belgrade, ME (US); Srinivas Akella, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 1101 days.

(21) Appl. No.: 11/176,508

(22) Filed: Jul. 7, 2005

(65) Prior Publication Data

US 2006/0021875 A1 Feb. 2, 2006

Related U.S. Application Data

(60) Provisional application No. 60/585,985, filed on Jul. 7, 2004.

(51) Int. Cl.
*G01B 21/00* (2006.01)

(52) U.S. Cl. ............................ 702/31; 702/19; 702/22; 702/32; 422/100; 436/180; 700/266

(58) Field of Classification Search ................. 422/100; 700/86, 89, 266; 702/19, 22, 31, 32; 436/180
See application file for complete search history.

(56) References Cited

U.S. PATENT DOCUMENTS

| | | | | |
|---|---|---|---|---|
| 6,565,727 | B1 | 5/2003 | Shenderov | |
| 6,773,566 | B2 | 8/2004 | Shenderov | |
| 6,858,184 | B2 | 2/2005 | Pelrine et al. | 422/68.1 |
| 6,866,762 | B2 | 3/2005 | Gascoyne et al. | |
| 6,911,132 | B2 | 6/2005 | Pamula et al. | |
| 6,958,132 | B2 | 10/2005 | Chiou et al. | |
| 6,989,234 | B2 | 1/2006 | Kolar et al. | |
| 7,010,391 | B2 | 3/2006 | Handique et al. | 700/266 |

(Continued)

OTHER PUBLICATIONS

Ding et al. "Scheduling of Microfluidic Operations for ReconfigurableTwo-Dimensional Electrowetting Arrays", IEEE Transactions on Computer-Aided Design of Integrated Circuits and Systems, vol. 20, No. 12, Dec. 2001, pp. 1463-1468.*

(Continued)

*Primary Examiner*—Jill Warden
*Assistant Examiner*—Shogo Sasaki
(74) *Attorney, Agent, or Firm*—Heslin Rothenberg Farley & Mesiti P.C.

(57) ABSTRACT

The present invention provides, in a first aspect, a method, system, and program product for controlling chemical reactions in a digital microfluidic system that include logically partitioning cells of a digital microfluidic system array into a plurality of virtual components wherein at least one of the virtual components is capable of handling droplets of reactants associated with distinct chemical reactions concurrently. In a second aspect, a respective next cell is determined for each of a plurality of chemical droplets in the digital microfluidic system array, which may include droplets of reactants associated with distinct chemical reactions. In another aspect, a method, system, and program product for controlling chemical reactions in a digital microfluidic system in accordance with the present invention induce a chemical droplet of the plurality of chemical droplets in the digital microfluidic system array to move to the respective next cell determined for the chemical droplet.

36 Claims, 12 Drawing Sheets

U.S. PATENT DOCUMENTS

| | | | | |
|---|---|---|---|---|
| 2003/0164295 | A1 | 9/2003 | Sterling | 204/450 |
| 2004/0055891 | A1 | 3/2004 | Pamula et al. | 205/98 |
| 2004/0058450 | A1 | 3/2004 | Pamula et al. | 436/150 |
| 2004/0231987 | A1 | 11/2004 | Sterling et al. | 204/450 |
| 2006/0036348 | A1 | 2/2006 | Handique et al. | 700/266 |
| 2006/0054503 | A1 | 3/2006 | Pamula et al. | 204/450 |
| 2006/0114296 | A1 | 6/2006 | Gascoyne et al. | 347/73 |

OTHER PUBLICATIONS

K.F. Böhringer. Optimal strategies for moving droplets in digital microfluidic systems. In *Seventh International Conference on Miniaturized Chemical and Biochemical Analysis Systems* (*Micro TAS '03*), Squaw Valley, CA, Oct. 2003.

K.F. Böhringer. Towards optimal strategies for moving droplets in digital microfluidic systems. In *IEEE International Conference on Robotics and Automation*, New Orleans, LA, Apr. 2004.

* cited by examiner

METHOD, SYSTEM, AND PROGRAM PRODUCT FOR CONTROLLING CHEMICAL REACTIONS IN A DIGITAL MICROFLUIDIC SYSTEM

CROSS-REFERENCE TO RELATED APPLICATIONS

U.S. Provisional Patent Application Ser. No. 60/585,985, by Griffith, et al., entitled "A METHOD FOR THE DESIGN AND CONTROL OF PLANAR ARRAY DIGITAL MICROFLUIDICS SYSTEMS", is hereby incorporated herein by reference in its entirety.

GOVERNMENT RIGHTS STATEMENT

This invention was made with U.S. Government support under Grant No. IIS-0093233 from the National Science Foundation (NSF). The U.S. Government has certain rights in the invention.

BACKGROUND OF THE INVENTION

1. Technical Field

The present invention generally relates to microfluidic systems, and, more particularly, to controlling chemical reactions in digital microfluidic systems.

2. Background Information

The creation of miniature biochemical analysis systems using microfabrication technology is a recent significant development in the field of microfluidics. These systems are often called micro total analysis systems or "lab on a chip" systems. These systems offer a number of advantages, including size reduction, power reduction, and increased reliability. However, current "lab on a chip" systems are typically tailored to a specific task. Therefore, it would be desirable to create reconfigurable and reprogrammable microfluidics systems capable of handling a variety of analysis tasks.

Digital microfluidic systems (DMFS) that use techniques such as electrowetting and dielectrophoresis are promising candidates for reconfigurable systems. One type of microfluidic system manipulates discrete droplets by electrowetting, where the interfacial tension of the droplets is modulated with a voltage. Droplets that are microliters in volume have been moved at 12-25 cm/sec on planar arrays of 0.15 cm wide electrodes. The ability to control individual droplets on a planar array, for example, enables complex chemical analysis operations to be performed in chemical "lab-on-a-chip" systems. For example, they can be used to perform DNA polymerase chain reactions for DNA sequence analysis and glucose assays. For many chemical analysis operations, no special purpose devices are required aside from the array itself. Systems utilizing such arrays have the potential to process hundreds of samples quickly. Thus, there is also a need for a method of concurrently coordinating the movements of a large number of droplets in a droplet-based system.

SUMMARY OF THE INVENTION

The present invention provides, in a first aspect, a method, system, and program product for controlling chemical reactions in a digital microfluidic system that include logically partitioning cells of a digital microfluidic system array into a plurality of virtual components wherein at least one of the virtual components is capable of handling droplets of reactants associated with distinct chemical reactions concurrently. In a second aspect, this method, system, and program product for controlling chemical reactions in a digital microfluidic system determines a respective next cell for each of a plurality of chemical droplets in the digital microfluidic system array, including droplets of reactants associated with distinct chemical reactions. In another aspect, a method, system, and program product for controlling chemical reactions in a digital microfluidic system in accordance with the present invention induce a chemical droplet of the plurality of chemical droplets in the digital microfluidic system array to move to the respective next cell determined for the chemical droplet.

The present invention also provides, in another aspect, a method, system, and program product for controlling chemical reactions in a digital microfluidic system that further comprises dynamically allocating at least one virtual component of the plurality of virtual components to process an instance of a type of chemical reaction. The type of chemical reaction is selected from at least one chemical reaction defined by a representation readable by the digital microfluidic system.

The present invention additionally provides, in a further aspect, a method, system, and program product for controlling chemical reactions in a digital microfluidic system wherein the determination of a respective next cell for each of a plurality of chemical droplets comprises selecting a destination virtual component for the chemical droplet from the plurality of virtual components if the chemical droplet is not currently assigned a destination.

These, and other objects, features and advantages of this invention will become apparent from the following detailed description of the various aspects of the invention taken in conjunction with the accompanying drawings.

BRIEF DESCRIPTION OF THE DRAWINGS

FIG. 4(*b*) illustrates an exemplary layout for a rotary arrangement of virtual components utilized in one embodiment of the present invention.

DETAILED DESCRIPTION OF THE INVENTION

Figure 1:
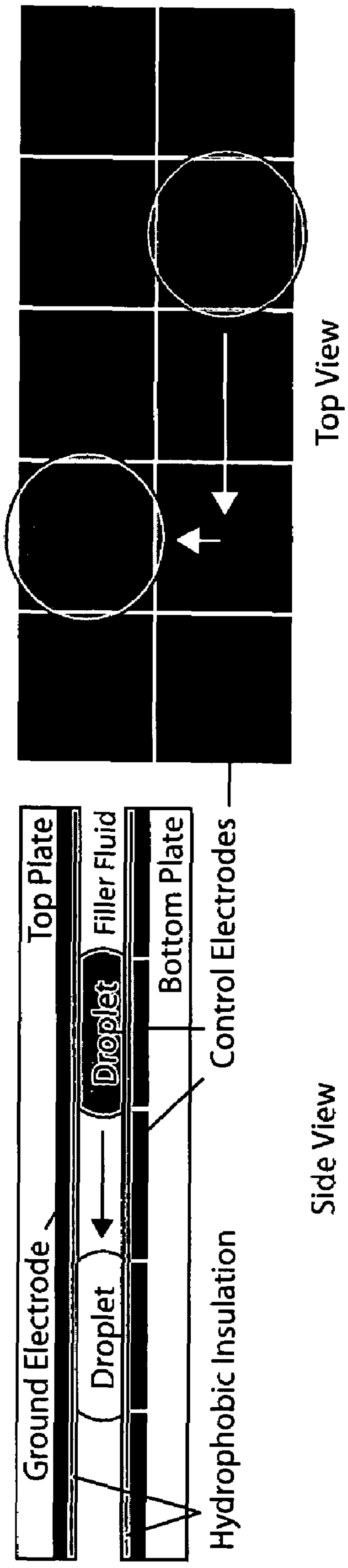
FIG. 1 illustrates an example of a digital microfluidic system array for moving chemical droplets using an electrowetting technique.

A general-purpose, dynamically reconfigurable discrete-flow lab-on-a-chip system comprises a digital microfluidic system array and a controller for coordinating the movements of multiple chemical droplets in the digital microfluidic system array. A digital microfluidic system (DMFS) has the capability to control the movement of discrete droplets through an array of cells that comprise the digital microfluidic system array. Accordingly, a discrete-flow (i.e., droplet-based) microfluidic system results rather than a continuous-flow microfluidic system. By controlling the movement of droplets of chemical reactants in the DMFS array, chemical reactions are controlled in the DMFS, and chemical analyses comprising one or more constituent chemical reactions or processing steps may be effected. A chemical reaction may include, in one example, one of a series of constituent mixing and splitting operations in the synthesis of a chemical product. In another example, a chemical reaction may comprise the synthesis of ink of a desired color from droplets of primary colors. It should be noted that the term discrete-flow microfluidic system (DFMFS) is used interchangeably below with the term digital microfluidic system (DMFS).

A cell of the digital microfluidic system array that utilizes an electrowetting technique, for example, is an area controlled by or including an electrode. A cell of digital microfluidic system array may also include other devices such as a light emitting diode (LED) or heating element. In one embodiment, individual cells of the digital microfluidic system array are addressable, permitting direct control of individual droplets.

One embodiment of a method of controlling chemical reactions in a digital microfluidic system comprises: (i) logically partitioning cells of a digital microfluidic system into virtual components; (ii) determining a respective next cell for each of a plurality of chemical droplets in the digital microfluidic system, the plurality of chemical droplets comprising droplets of reactants; and (iii) inducing one or more of the chemical droplets to move to its respective next cell. At least one of the virtual components created by the logical partitioning of the cells of the digital microfluidic system is capable of handling droplets of reactants associated with distinct chemical reactions concurrently. The distinct chemical reactions are either different instances of the same type of chemical reaction or instances of different types of chemical reactions. Moreover, the virtual components may be dynamically allocated to process instances of one or more types of chemical reactions, which are defined by representations readable by the digital microfluidic system.

One embodiment of a reconfigurable, general-purpose digital microfluidic system for a DNA polymerase chain reaction and other analyses is described in more detail below. A design of the logical partitioning of a DMFS array utilizing modular components is described, along with the control algorithms to select destination components for the droplets in the system and to route the droplets via a decentralized technique. This embodiment of the invention, performing a DNA polymerase chain reaction and other analyses, has been modeled and simulated using computer software. Advantageously, the system embodiment described below is capable of successfully coordinating hundreds of droplets simultaneously and performing one or more chemical analyses concurrently.

Many common operations for chemical or biochemical analyses can be performed on a DMFS array without additional special purpose hardware. These operations include: dispensing droplets onto the array, collecting droplets from the array, transporting droplets around the array, mixing droplets together, and splitting droplets apart. FIG. 1 illustrates an example of a digital microfluidic system array that may be utilized in an embodiment of the present invention. In the DMFS array shown in FIG. 1, droplet motion is controlled by turning electrodes on and off. In a preferred embodiment, the array layout design comprises a combination of various "virtual components," i.e., logical groupings of the cells of the digital microfluidic system that together perform a function. Each type of virtual component is responsible for performing one or more types of operations. Multiple instances of the same type of component may be present, and each virtual component instance is allotted an area of the array in which to perform its operations. By linking virtual components that can perform all the constituent operations in an analysis, a DMFS is created that is capable of performing that analysis.

In one exemplary embodiment of the system, six virtual component types are defined. These virtual component types include the street, connector, and intersection virtual components. The functions of the street, connector, and intersection virtual components involve transporting chemical droplets around the array. The source virtual component adds droplets to the array, and the sink virtual component removes droplets from the array. The work area virtual component manages the mixing and splitting of chemical droplets. In addition, new virtual component types may be defined and integrated into the system for operations that may be performed by a combination of cells in a DMFS array because a virtual component is defined simply by a logical partitioning of the array's cells.

Figure 2:
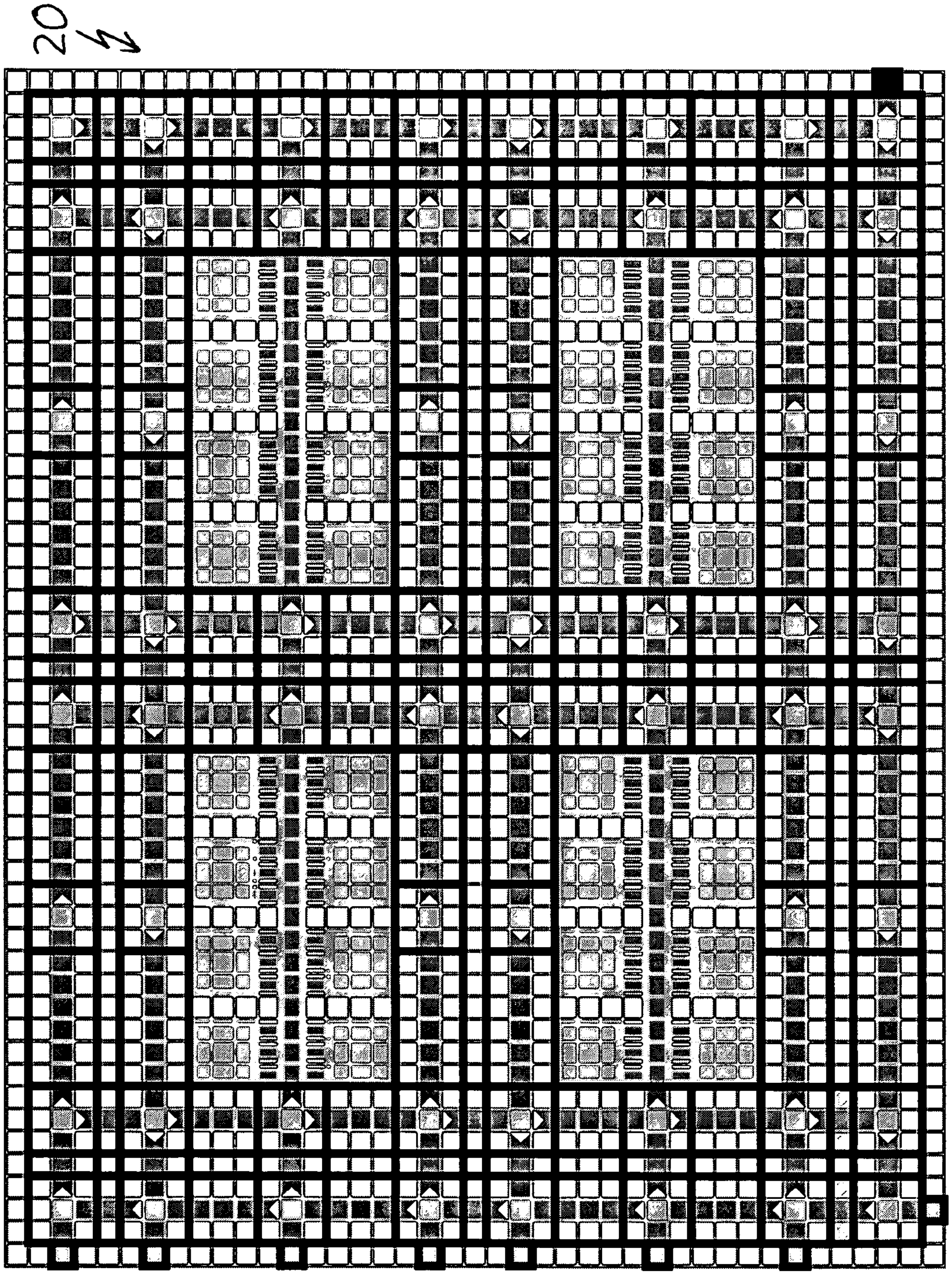
FIG. 2 illustrates an example of a digital microfluidic system array layout obtained by partitioning the cells comprising the array into virtual components in accordance with one embodiment of the present invention.
Figures 3A, 3B, 3C, 3D, 3E, 3F:
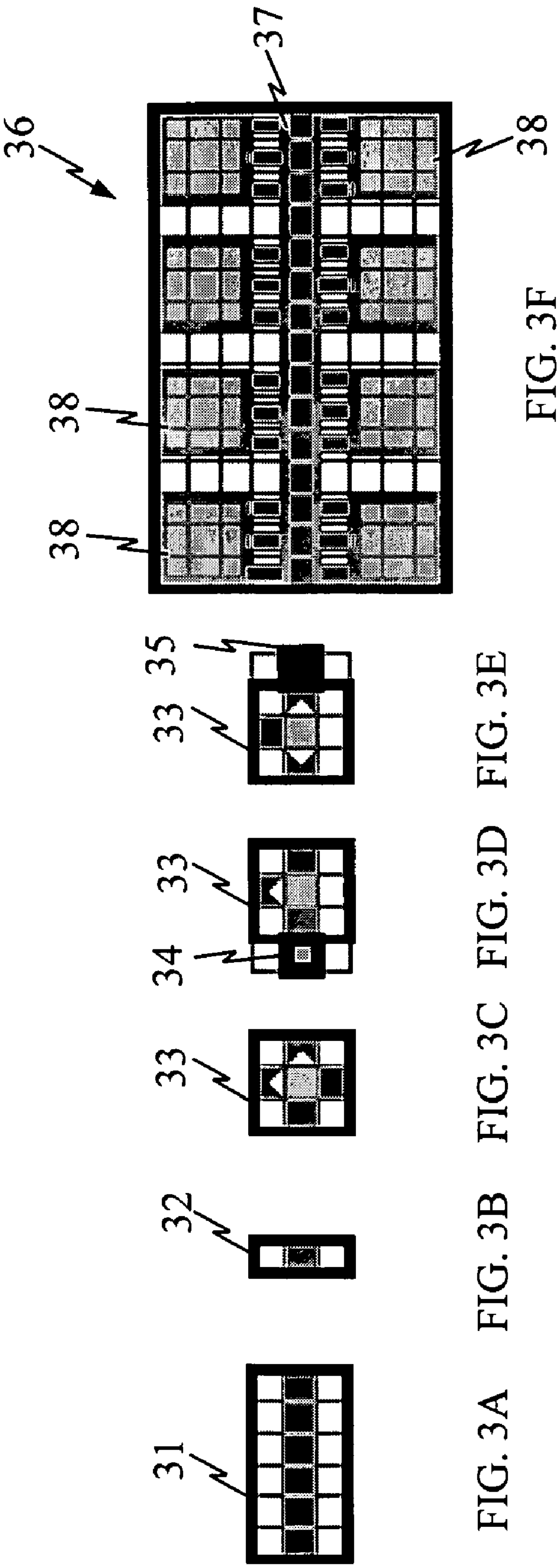
FIGS. 3(*a*) through 3(*f*) illustrate exemplary layouts for several virtual components utilized in one embodiment of the present invention.

A virtual component manages all of the droplets that are in its portion of the array. During each clock cycle of the system, a virtual component attempts to move all of the chemical droplets in its section of the array. Each component maintains connections with its neighboring virtual components; these connections are used to pass control of the droplets when the droplets move between virtual components. The connections are entrance/exit pairs such that the exit from one virtual component is the entrance into another. Also, a virtual component may have to wait until one or more of the virtual components to which it is connected has moved chemical droplets located within their boundaries before it can to move its droplets. FIG. 2 shows an example of a digital microfluidic system array layout obtained by partitioning the cells comprising the array into virtual components. Each cell of the DMFS array illustrated in FIG. 2 is represented by a square. The exemplary DMFS array layout 20 shown in FIG. 2 comprises each of the six component virtual types defined above. FIGS. 3(*a*) through 3(*f*) illustrate one embodiment of each of the following virtual components, respectively: street component 31, connector component 32, intersection component 33, source component 34 shown connected to intersection component 33, sink component 35 shown connected to intersection component 33, and work area component 36. The layout formed by the logical partitioning of the DMFS array shown in FIG. 2 will be described in more detail below.

One embodiment of street component 31 is illustrated in FIG. 3(*a*). A street component is a general-purpose droplet transportation virtual component. Street component 31 moves droplets in one direction through at least two array cells. Streets are one-way to prevent two droplets from moving in opposite directions through the component. A street attempts to advance all droplets within it in synchrony at each clock cycle. If moving any droplet would cause it to inadvertently split or inadvertently merge with another droplet, the droplet is not allowed to move.

One embodiment of connector component 32 is illustrated in FIG. 3(*b*). A connector component is similar to a street component, except that a connector component comprises a single cell through which a droplet moves. The distinction is made because droplets in the connector are adjacent to two virtual components simultaneously. Thus, when a droplet attempts to enter a connector, the connector ensures that there is no other droplet adjacent to the connector.

One embodiment of intersection component 33 is illustrated in FIG. 3(*c*). This embodiment of intersection component 33 has two entrances and two exits, which are marked by arrowheads. An intersection component is important to the droplet routing system. Droplets enter an intersection and then move into its middle cell. Once a droplet arrives in a middle cell of an intersection component, the intersection routes the droplet to an appropriate exit based on a routing algorithm described hereinbelow.

One embodiment of work area component 36 is illustrated in FIG. 3(*f*). A work area component is a virtual component where mixing chemical droplets and splitting a chemical droplet take place. Each work area component has a transit area 37 and multiple work units 38. Each work unit may function as a mixer or as a splitter or as both a mixer and a splitter. A mixer merges two chemical droplets into a new droplet. A mixer moves the droplet around to speed up mixing. Splitters split a mixed droplet into two droplets. A work unit may be used as a mixer until a mixing operation is completed, and then part of that same area may be used as a splitter. In a preferred embodiment, every mixing operation is followed by a splitting operation to control the size of droplets in the array. A work area component can mix and split multiple droplets at the same time because it comprises multiple work units. When a droplet gets to a work area component, the work area component sends the droplet to one of the work area component's work units. The work units manage the droplets assigned to them. Once a mix and split operation is complete, the resulting chemical droplets are moved out of the work area component.

One embodiment of source component 34 is illustrated in FIG. 3(*d*) together with intersection component 33. A source component represents a chemical droplet entry point into the DMFS array. Each source introduces specified droplet types at specified intervals. Droplets entering the array are assigned a goal operation.

One embodiment of sink component 35 is illustrated in FIG. 3(*e*) together with intersection component 33. A sink component represents a chemical droplet exit point from the DMFS array. Each sink removes specified droplet types from the array.

It is desirable for a digital microfluidic system to be able to handle a large number of chemical droplets concurrently. Advantageously, the control technique of the present invention automates planning the droplets' motions. In accordance with an embodiment of the present invention, a DMFS array is partitioned into virtual components. This partitioning simplifies the control of movements of the droplets because the partitioning results in restrictions being placed on where operations on the droplets can take place on the array. The interconnection of the virtual components can be viewed as a network with the intersection components functioning as the routing devices and the street components and connector components functioning as the "wires" of the network by analogy. The application of this analogy permits techniques for network routing on a directed graph to be adapted for utilization in droplet motion planning control.

The following is an exemplary two-fold process used to select destinations for chemical droplets in the DMFS array. First, a chemical droplet is assigned to a chemical reaction or an operation to be performed. Once a droplet has an assigned chemical reaction or operation, a virtual component for that chemical reaction or operation may be selected.

The DMFS system is supplied with parameters, which the DMFS system uses to maintain a list of virtual components available for certain operations. Work area components can perform a mixing operation with any droplet type, and sink components remove specific types of chemical droplets from the DMFS system. Each work area component and sink component adds itself to an ordered list of virtual components accepting droplets for operations. There is also an ordered list of higher priority containing requests from virtual components for specific chemical droplet types required to complete an operation. In one embodiment, only work area components needing one of two chemical droplet types for a mixing operation place requests in this higher priority list.

When a new chemical droplet enters the digital microfluidic system array, or when a new chemical droplet is created through a mixing operation, the corresponding source component or work area component assigns the new chemical droplet to a chemical reaction or an operation to be performed. When a droplet enters an intersection component, the intersection component tries to find a destination virtual component to which to send the droplet, and the intersection component attempts to find an available path to the droplet's assigned destination.

Figure 9:
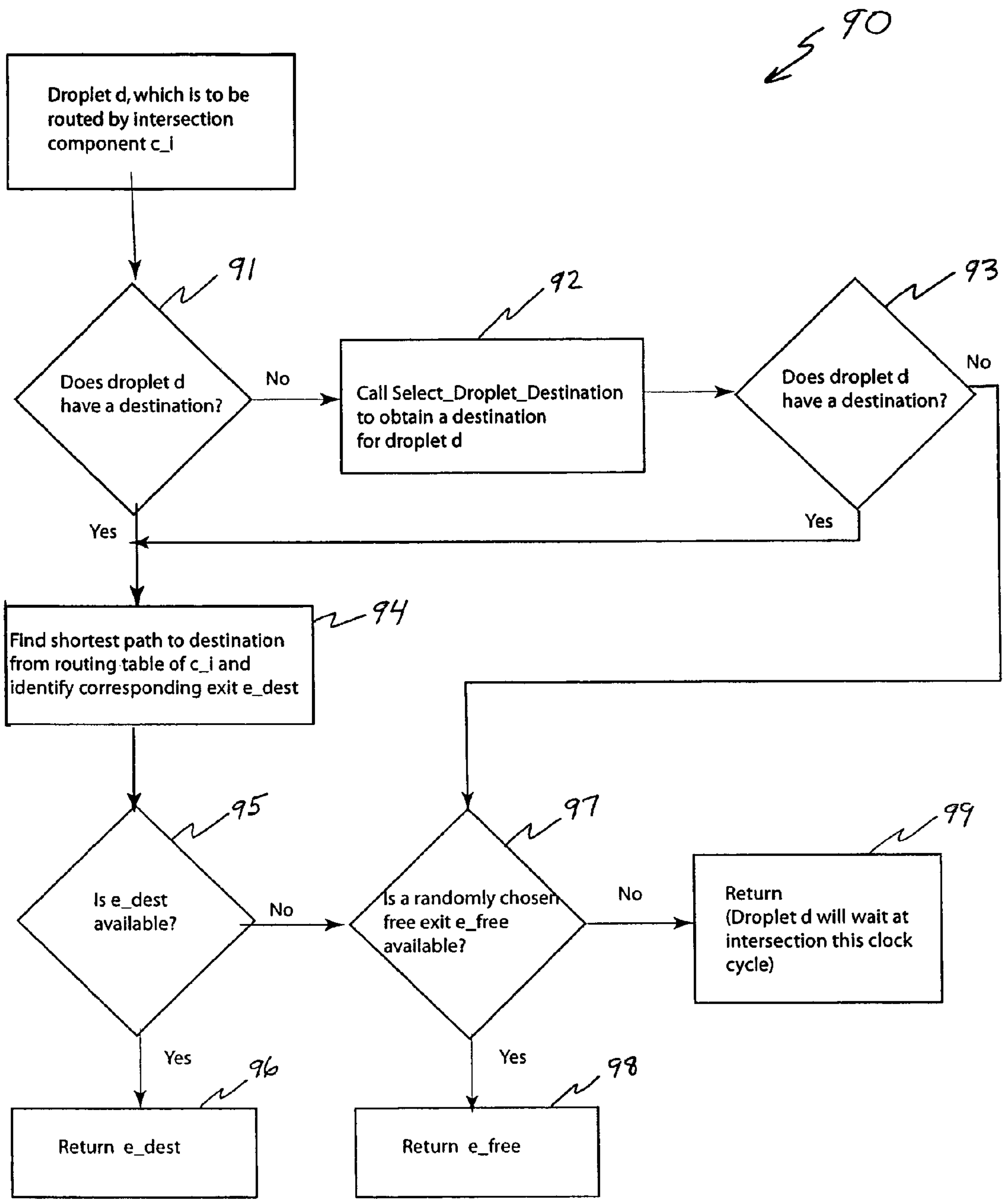
FIG. 9 illustrates a flow chart for an exemplary routing technique utilized by one embodiment of a method of controlling chemical reactions in a digital microfluidic system in accordance with the present invention.

FIG. 9 illustrates flow chart 90 for an exemplary routing technique utilized by an intersection component in one embodiment of a method of controlling chemical reactions in a digital microfluidic system array in accordance with the present invention. Initially, the virtual component's control function determines whether a chemical droplet that has entered the virtual component has an assigned destination (step 91). If not, the virtual component's control function attempts to assign a destination virtual component to the droplet in step 92. Then, in step 93, the virtual component's control function again determines whether a destination virtual component has been assigned to the previously unassigned droplet. If the droplet has been assigned a destination, processing continues with step 94, wherein the shortest path to the assigned destination virtual component is found in the intersection component's routing table, and the exit from the intersection component corresponding to the shortest path is identified. In step 95, the intersection's control function determines whether the corresponding exit is available. If so, the corresponding exit is determined as the next cell to which to move the droplet (step 96).

If the corresponding exit is not available or if the processing of step 93 determines that a destination virtual component has not been assigned to the droplet, the intersection component's control function determines whether a randomly-chosen exit is available in step 97. If so, the randomly-chosen free exit is determined to be the next cell to which to move the droplet (step 98). Alternatively, if the randomly-chosen exit is not available, the droplet waits in its current cell during the current clock cycle. That is, the droplet's next cell is determined to be its present cell.

Figure 10:
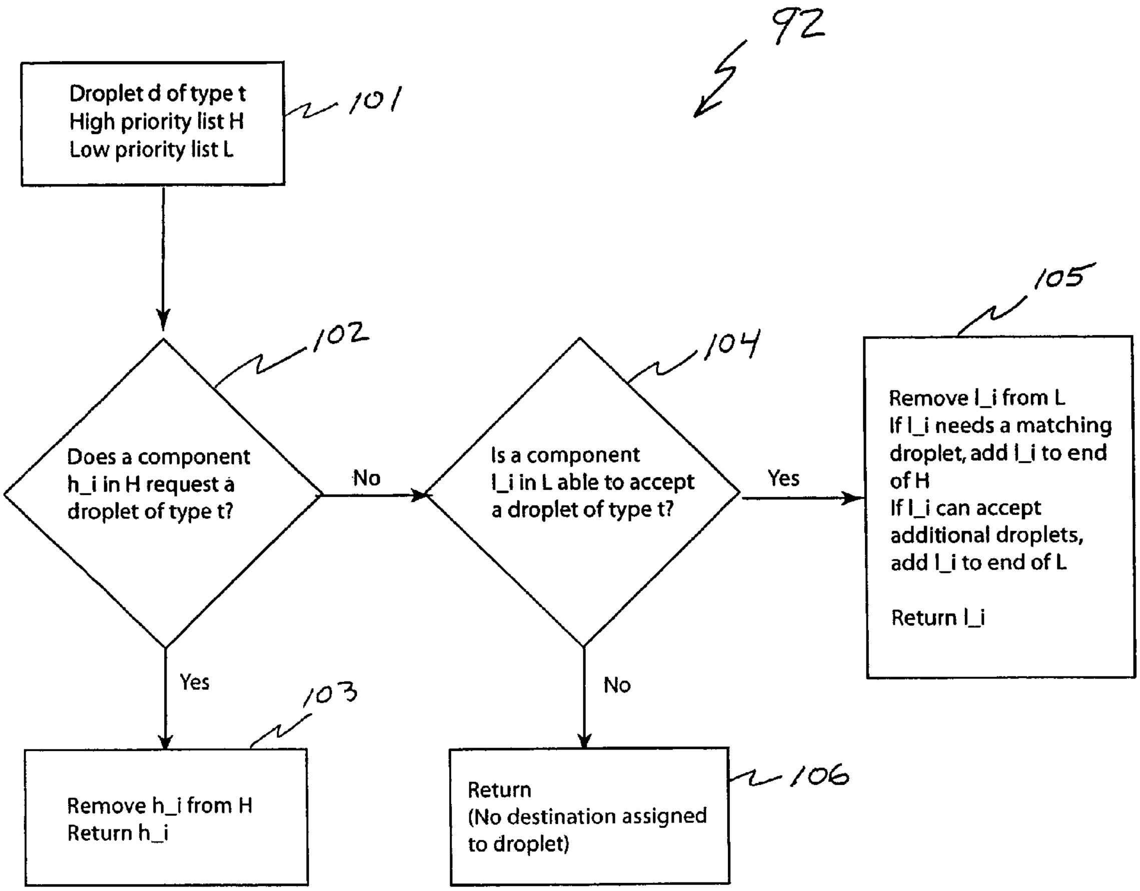
FIG. 10 illustrates a flow chart for an exemplary technique for assigning a destination to a droplet that is utilized by the routing technique illustrated in FIG. 9.

FIG. 10 illustrates a flow chart that summarizes an exemplary technique for assigning a destination to a droplet that comprises step 92 of the routing technique illustrated in FIG. 9. In this example, the control processing accesses the following data (step 101): the type of the chemical droplet, a higher priority requester list, and a lower priority acceptor list. In step 102, the intersection component's control function checks this higher priority list for existing requests by virtual components for the droplet's type and assigned chemical reaction or operation. If any requests exist, the droplet is assigned to the first requesting virtual component in the higher priority list in step 103, and that request is removed from the list. If there is no request in the higher priority list for a chemical droplet of the new droplet's type and assigned chemical reaction type, the new chemical droplet is assigned to the first virtual component that can accept a chemical droplet of its type (step 105) if the lower priority list indicates that a virtual component can accept the droplet (step 104), and the selected destination virtual component is moved to the end of the list if the destination virtual component is a sink component or a work area component with work units still available (step 105). Also, in step 105, the virtual component from the lower priority list may be added to the higher priority list after a droplet is assigned to it because the destination virtual component may need another chemical droplet to perform a chemical reaction as a consequence of being assigned a new chemical droplet. If no virtual component is available as a destination for the new droplet, then no destination is assigned to the droplet (step 106), and the next intersection that this unassigned droplet enters attempts to assign the unassigned droplet a destination. In a worst-case scenario, this operation takes O(w+s) time for one droplet at one intersection component, where w is the number of work areas and s is the number of sink components in the system.

After a droplet is assigned a destination virtual component, the droplet is routed to the destination virtual component. A routing technique used by the control method for the digital microfluidic system can be viewed as a deflection routing variant of the Open Shortest Path First (OSPF) network protocol. This routing technique relies on each intersection component maintaining shortest path information to the other virtual components; the required shortest path information is computed from a component graph. A component graph is a directed graph where each node is a virtual component of the DMFS, and each edge of the directed graph is a connection between adjacent virtual components. The directed edge points from a virtual component with an exit to an adjacent virtual component having an entrance corresponding to that exit. The distance along an edge of the directed graph is taken to be, generically, the length of the virtual component containing the exit of the edge.

When the DMFS system is initialized, each intersection component computes and stores its routing table, which maps the shortest path to each virtual component to a corresponding exit from the intersection component. The exit listed in the routing table is the first leg of the shortest path to the virtual component associated with that entry. Each intersection component constructs its routing table by running Dijkstra's algorithm on the component graph to compute shortest paths from that intersection component. In an exemplary routing technique of the present invention, a shortest path should not travel through work area components, source components, or sink components, unless one of those virtual components is the assigned destination for a droplet. Dijkstra's algorithm on a sparse graph using a standard implementation has a runtime of O(n log n) where n is the number of nodes in the graph. Since Dijkstra's algorithm is run from each of the intersection components, this routing technique has an initial overhead of O(i·n log n), where i is the number of intersection components in the DMFS array.

Figure 12:
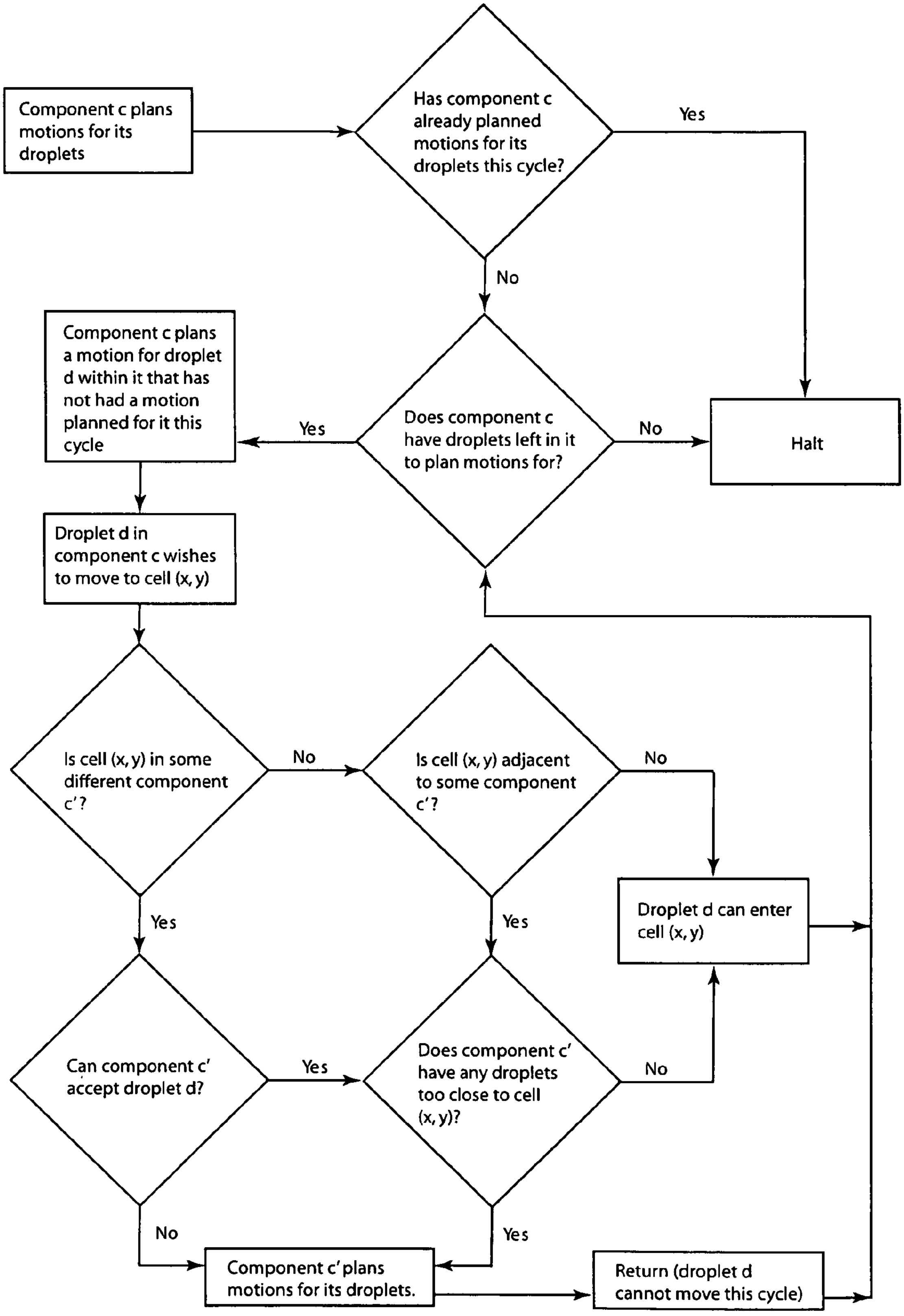
FIG. 12 illustrates a flow chart of an example of processing utilized by a virtual component to plan the movements of droplets.

At each clock cycle, the intersection components, in a fixed but randomly-selected order, select their droplet routing moves. Flow chart 120 of FIG. 12 illustrates one example of processing utilized by a virtual component to plan the next movements of droplets currently located within the virtual component. Subsequently, synchronous motion of the droplets in the DMFS array is effected. Chemical droplet routing may be performed once the routing tables have been constructed. If a droplet entering an intersection component has no assigned destination, then the intersection component attempts to assign such an unassigned chemical droplet a destination virtual component. If the droplet cannot be assigned a destination virtual component, then the droplet is sent to a randomly-chosen, valid exit. Otherwise, the intersection component finds the destination virtual component assigned to the droplet in its routing table and selects the exit of the intersection component that is the best choice for routing the droplet. If the droplet is able to move toward that exit, it does so. Otherwise, the intersection component randomly chooses a valid exit for the droplet. If no viable exit is available, then the droplet waits; that is, the next cell for the droplet is the current cell in which the droplet is currently located. The amount of time required for selecting an exit for a droplet is O(1) because an intersection component checks at most three possible exits and because the routing table has a constant access time.

One embodiment of a general-purpose DMFS in accordance with the present invention comprises a combination of a virtual-component-based layout design and routing control algorithms for the chemical droplets in the DMFS array. A general-purpose layout preferably handles arbitrary analyses that require the movement, mixing, and splitting of different types of chemical droplets. Further, an exemplary layout contains a sufficient number of work area virtual components to be able to efficiently transport chemical droplets around the array.

Efficient droplet transportation is advantageous because the usage of a general-purpose DMFS system is not known in advance. Therefore, all parts of the array should be accessible. In the embodiment described in the following, street components are grouped in pairs to provide two-way streets 41 (FIG. 4(*a*)), allowing chemical droplets to closely follow the same path between two locations in the array in both directions. To provide intersection components between instances of these two-way streets, four intersection components are grouped together in rotary 42 as illustrated in FIG. 4(*b*).

Figure 5:
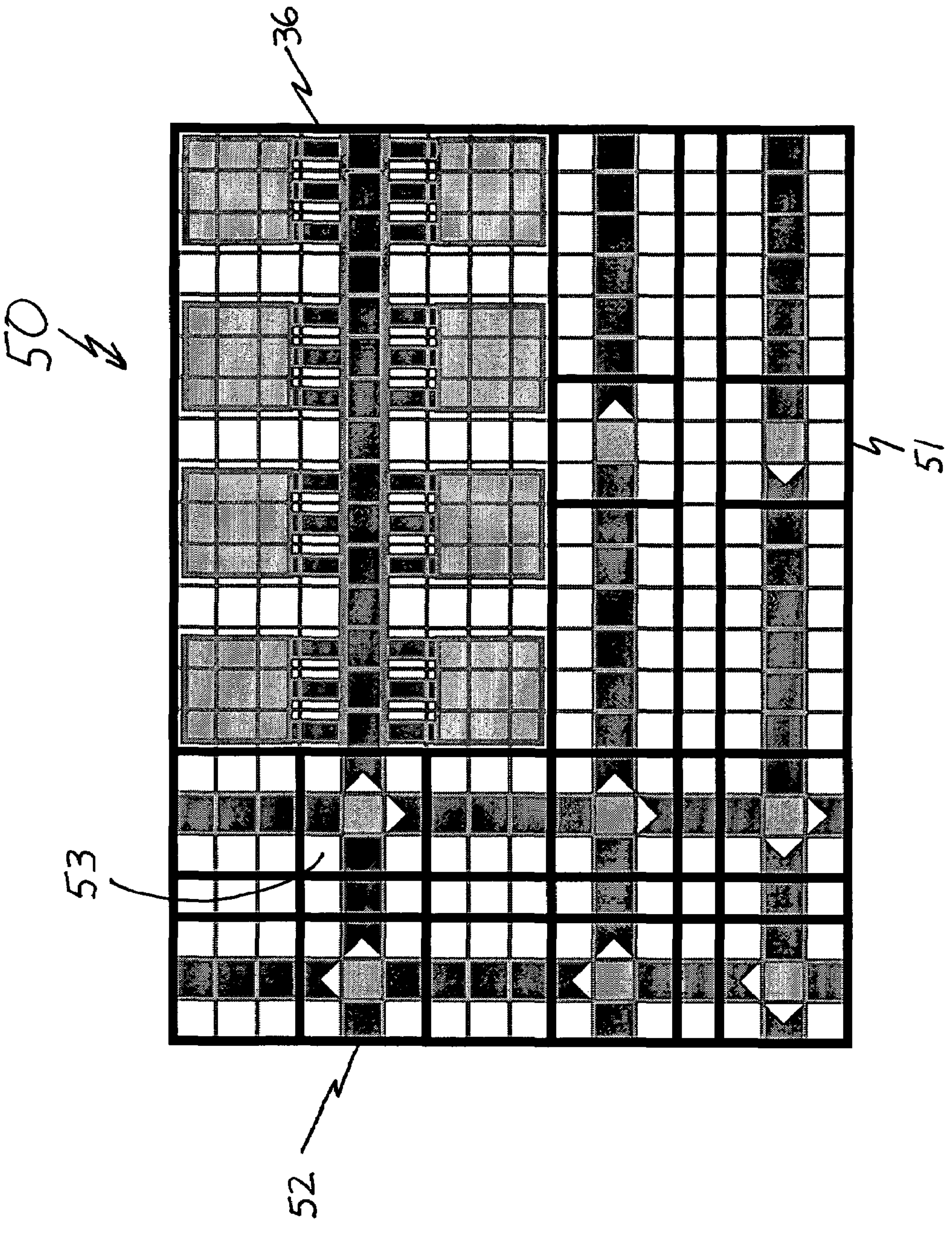
FIG. 5 illustrates an exemplary layout for one embodiment of a tile utilized in the exemplary digital microfluidic system array layout shown in FIG. 2.

Two-way streets and rotaries are grouped with a work area component to form a pattern of virtual components called a tile. One embodiment of tile 50 illustrated in FIG. 5 provides a balance between the number of work area components and ease of access. The DMFS array layout comprises a periodic repetition of the pattern of tile 50 augmented with an alternating sequence of rotaries and two-way streets along the upper and right edges of the array as shown in FIG. 2, for example. Extra intersection components 51 and 52 in the two-way streets in FIG. 5 facilitate connecting sources and sinks around the perimeter of the logical layout of the array. Intersection components 52 and 53 in the vertical street components are connected to provide shorter paths to and from work area component 36.

To generate the layout (i.e., logical partitioning of the DMFS array), the user specifies a set of parameters dependent on the array hardware. These parameters include the physical size of the array and the locations of sources and sinks. To initialize the general-purpose digital microfluidic system for the chemical analyses to be performed, a user specifies parameters based on the chemical analyses to be performed, including the types of chemical droplets introduced at source components, when and how often the types of chemical droplets are produced, the types of droplets to send to the sink components, and information about the various intermediate operations to perform with the droplets on the DMFS array.

Figure 4B:
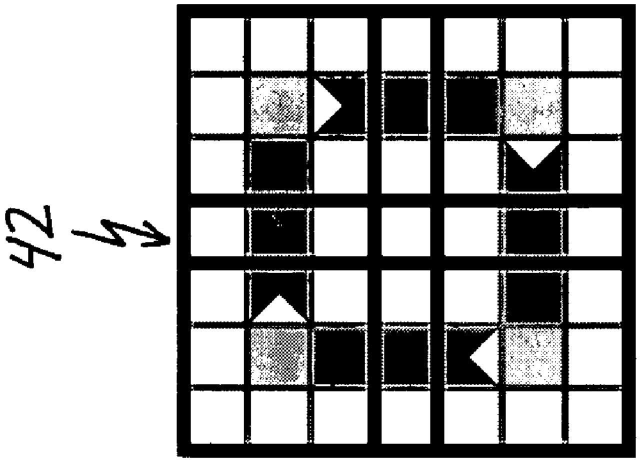
FIG. 4(*a*) illustrates an exemplary layout for one embodiment of a two-way street virtual component utilized in one embodiment of the present invention.
Figure 4A:
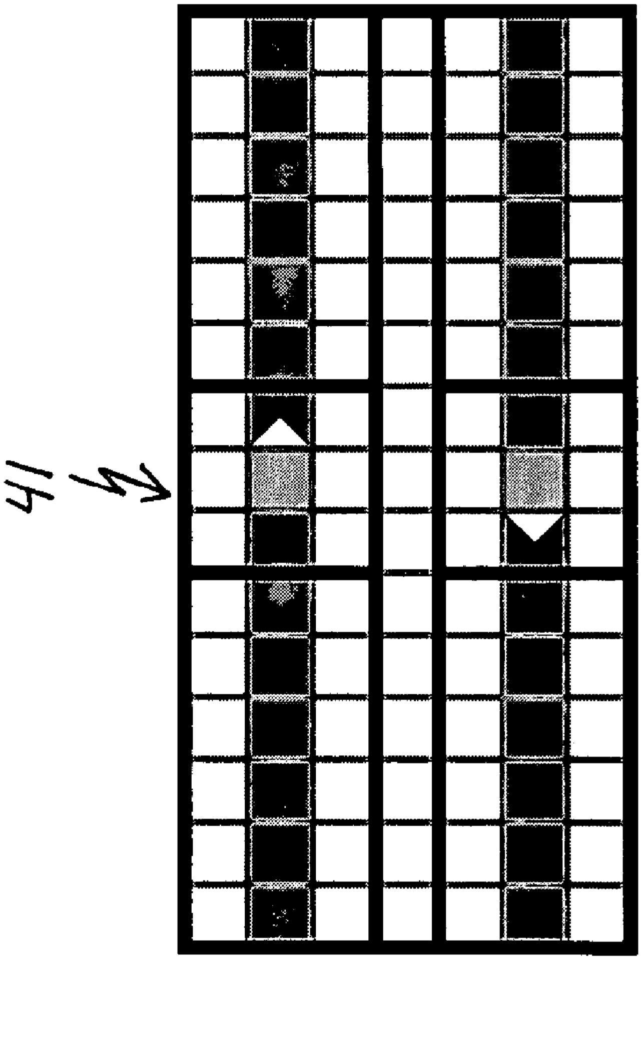

The size of an array constructed from instances of tile 50 in FIG. 5 and two-way streets 41 and rotaries 42 of FIG. 4 as described above has a width of 9+22i cells and a height of 9+16j cells, where the layout is i tiles wide and j tiles tall. The pattern tile 50 illustrated in FIG. 5 is 22 cells wide and 16 cells tall. The arrangement of two-way streets and rotaries that completes the layout as illustrated in FIG. 2 adds an additional seven cells to the width and height. The sources and sinks are placed around the perimeter of the DMFS array such that each source component and each sink component can be connected to an intersection component. The remaining two cell units in each dimension of the array are allocated to setting aside one cell around all sides of the perimeter of the pattern for source components and sink components. An example of a layout with eight sources and one sink for such an embodiment is shown in FIG. 2.

Figure 11:
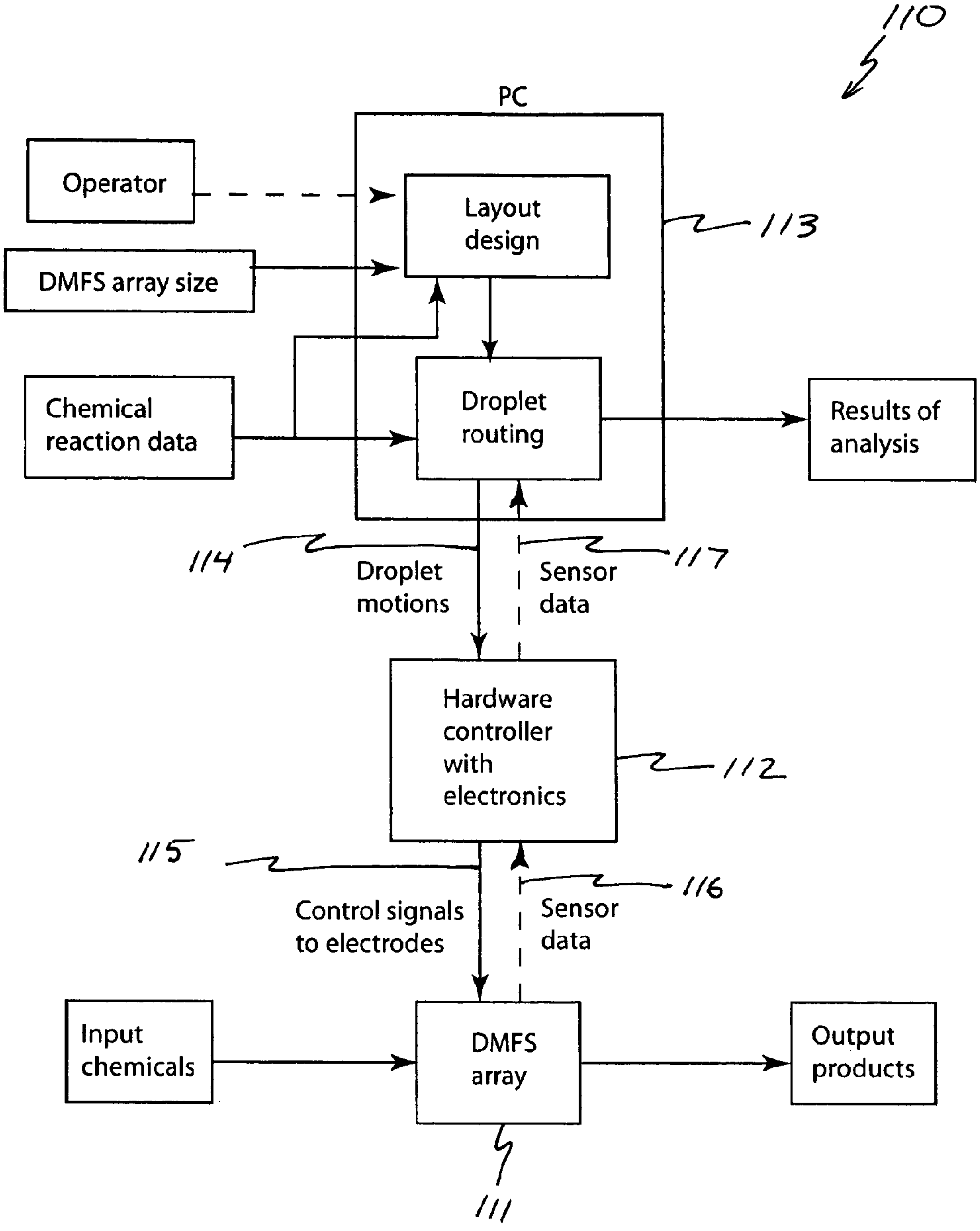
FIG. 11 illustrates one embodiment of a system for controlling chemical reactions in a digital microfluidic system array in accordance with the present invention.

FIG. 11 illustrates one embodiment of a system 110 for controlling chemical reactions in a digital microfluidic system array in accordance with the present invention. System 110 comprises digital microfluidic system array 111, controller 112, and computer 113. Chemical reactions in digital microfluidic system array 111 are controlled by controlling the movement of chemical droplets in the array. Computer 113 sends signal 114 comprising information that specifies the next movements of the droplets in the system to controller 112. Controller 112 sends at least one control signal, which is derived from signal 114, to the electrodes of digital microfluidic system array 111. The signals applied to the electrodes of digital microfluidic system array 111 cause the droplets to move to a new cell of digital microfluidic system (DMFS) array 111.

As illustrated in FIG. 11, droplets of chemicals are placed in DMFS array 111, and the chemical droplets produced by reactions in the DMFS array are output from the DMFS 111. Computer 113 executes a layout design program module and a droplet routing program module. The data accessed by computer 113 includes the size of DMFS array 111 and data pertaining to at least one chemical reaction controlled by system 110.

In another embodiment, at least one feedback signal 116 is provided from at least one sensor in digital microfluidic system array 111 to controller 112. In yet another embodiment, sensor signal 117 derived from feedback signal 116 is provided to computer 113. Sensor signal 117 may provide an indication of the result of a chemical analysis, for example. Those of ordinary skill in the art will readily recognize that computer 113 may comprise any of a number of known computing devices including a personal computer, microprocessor, computer workstation, and programmable digital signal processor chip.

One embodiment of a DMFS in accordance with the present invention is operable in both a batch mode and a continuous mode. In batch mode, all the chemical droplets for a chemical reaction or a chemical analysis are input at the source components in one batch. The movements of the droplets are coordinated to complete the chemical reaction, and then the next batch of droplets is processed. The chemical droplets are input in a synchronized manner based on when the droplets are required for the chemical reactions. After each mix and split operation, one of the two resulting droplets is sent to a waste output. A chemical reaction performed in a batch operational mode typically requires a smaller number of tiles in the DMFS array since the number of droplets in the system is relatively small.

Since droplet routing is almost entirely deterministic in batch mode, system behavior is easily analyzed. Only when no work units are available for a droplet will an intersection component route the droplet randomly.

In continuous mode, the source components input the chemical droplets at a fixed rate. (The rate for each droplet type may be specified by the human designer.) One advantage of continuous mode is that it produces a larger volume of product droplets than batch mode operation of the DMFS in the same amount of time. This advantage tends to occur especially when no droplets are discarded as waste droplets.

The behavior of a general-purpose digital microfluidic system changes with the chemical analysis it performs. A system operating in continuous mode may or may not be stable depending on its parameters. In an unstable system, droplets enter the system faster than the system is able to process them, and a steady-state flow cannot be guaranteed. If a system is not stable, in time it will become heavily congested and may finally become deadlocked. Hence, it is desirable to avoid instability.

A set of conditions for a system to be classified as unstable have been identified. At least one of the following two conditions determines whether a system will become congested due to instability. The first is for some droplets to be unable to follow the shortest paths to their destinations. The second condition is for droplets to be unable to be assigned a destination. When either condition is met, it is an indication that the system is not processing droplets fast enough. A system is deadlocked when droplets are unable to reach their destinations. Deadlock is a sufficient condition for a system to be unstable.

If congestion is considered to be an indicator of instability, conditions that lead to or result from congestion can be identified. By selecting system parameters such as input droplet rates and source and sink locations to avoid these conditions, the resulting system will likely be stable. Two techniques are used to identify these conditions. At the operational level, a graph of the operations to be performed based on the system parameters is analyzed. At the virtual component level, droplet flow in the system is modeled using the component graph.

A chemical (or biochemical) analysis graph provides an organized representation of the behavior of the digital microfluidic system. A chemical analysis graph is a directed graph with an input node for each droplet type entering the system, an output node for each droplet type leaving the system, and a mixing node for each mixing operation performed in the system. The nodes of an analysis graph are connected based on the droplet types that the nodes require and produce. The edges of an analysis graph represent transport operations. Each node stores the duration of its operation, and the analysis graph is augmented with additional information as illustrated in FIG. 6.

Figure 6:
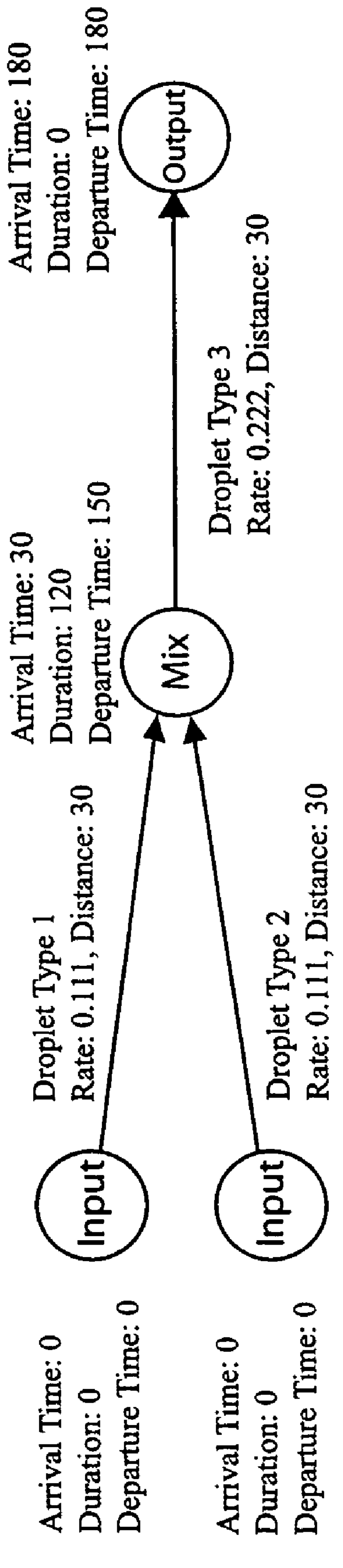
FIG. 6 illustrates an example of a chemical analysis graph utilized by an embodiment of the present invention.

The first augmentation of the analysis graph of FIG. 6 is the rate at which droplets enter and leave each node. Droplet rate may be intuitively described for a source component, for example. If a source introduces a particular droplet type once every k cycles, then the droplet rate would be 1/k droplets per cycle. Also, there would be k−1 empty cells between each introduced droplet. This droplet rate is propagated through the graph. If these droplets are reactants in a mixing operation, then, on average and assuming no unusual delays, one of these droplets would begin its mixing operation every k cycles. Similarly, one droplet would complete the mixing operation every k cycles.

The second augmentation of the analysis graph of FIG. 6 is the best-case expected distance for a droplet to travel between operations. Each node's operation may be performed at one or more virtual components in the array; specific virtual components are chosen during destination selection for the droplets. The expected distance is the average of the shortest paths between each possible originating virtual component and each possible destination virtual component. In a system with a source component introducing droplets for mixing into a digital microfluidic system with two work area components, the distance from the input node to the mixing node is the average of the lengths of the shortest paths from the source to each of the two work area components.

The third augmentation of the analysis graph illustrated in FIG. 6 is the best-case expected time at which the first chemical droplets will enter each node of the analysis graph. There is a separate arrival time from each parent node of a given node, and each arrival time is computed as the expected departure time from the parent node plus the best-case expected travel time from the parent node to the current node. The expected departure time from a given node is the average of the arrival times plus the duration of the operation.

The analysis graph is then checked to ensure that the following properties hold:

1. Every path from every source node leads to a sink node.

2. Droplets enter a node at the same rate from each parent node.

3. Arrival times to a node should be about the same from each parent node.

If an analysis graph does not satisfy all of these properties, inefficient processing of chemical droplets by the DFMS is likely to result. In the event that these properties are not satisfied, the system parameters may be adjusted until they result in a graph without violations of these rules.

The analysis graph provides a reasonable estimate of overall system stability. However, a more detailed component-level analysis of system stability may be desirable. For example, there may be certain bottleneck virtual components that become congested from too many droplets moving through them, resulting in a slowing down of droplet flow. These bottlenecks can result in an unstable system when they prevent droplets from reaching their destinations. Some simple experiments have demonstrated that this may arise in larger arrays (for example, arrays of size 295×297 cells), where there is a lot of droplet traffic around the perimeter near the sources and sinks but relatively light traffic in the interior. Modeling the droplet flow through the system is an effective tool to identify unstable systems, especially those that are unstable due to these bottleneck, congested components.

The droplet flow modeling predicts the expected flow through the component graph described above using the droplet rate information from the analysis graph. (See FIG. 7.) The idea is to determine the rate at which droplets enter and leave each virtual component on the array, which is the flow rate through that component, when the system is in a steady state. To approximate the expected flow rate through virtual components, an iterative, network-style analysis was developed. For this analysis, it is assumed that work area components are uniformly utilized. That is, a droplet being assigned to a work area component is equally likely to be assigned to any work area component on the array.

Each virtual component is initially assigned inflow and outflow rates of 0. Sources generate a certain amount of flow, as indicated by the analysis graph, destined for each work area component. For example, if a source produces droplets at a rate of ¼ in a system with two work areas, it generates a droplet flow rate of ⅛ to each work area component. Similarly, work area components generate a certain amount of flow destined for each work area component and to each sink component. At each iteration, the output of each node in the graph is defined as a function of the input to the node. The input of a node is the sum of the outputs, from the previous iteration, of its parent nodes plus any flow it generates at that iteration. For intersection components, the input flow is divided amongst the possible exits based on where the droplet flow is destined. If a particular node becomes congested, nodes sending droplets to the congested node try to redirect excess droplet flow away from the congested virtual component.

Nodes in the graph are assigned a maximum inflow capacity. For all nodes except work area components, this is set as ¼, which is the maximum rate that droplets may make a turn through an intersection component without inadvertently merging. The maximum inflow rate to a work area component is computed based on the duration of its operations in the analysis graph. For example, a system having the following characteristics illustrates this point: mixing operations take 100 cycles to complete; each mixing operation requires two droplets; and each work area component can support eight simultaneous mixing operations. If the droplets entered a work area component in this system at a rate of one droplet every seven cycles, the first mixing operation should complete shortly after, or even before, the eighth operation begins. Droplets would likely not be able to enter the work area component at a faster rate than this because there would not be any free work units. In order to remain within the maximum inflow rate capability of a virtual component, parent nodes may have to adjust their outflow rates. A reduction in a parent node's outflow rate may result in some of the parent node's inflow not translating into outflow. Consequently, the parent node is considered a congested node; that is, a node having an inflow rate greater than its outflow rate.

Figure 7:
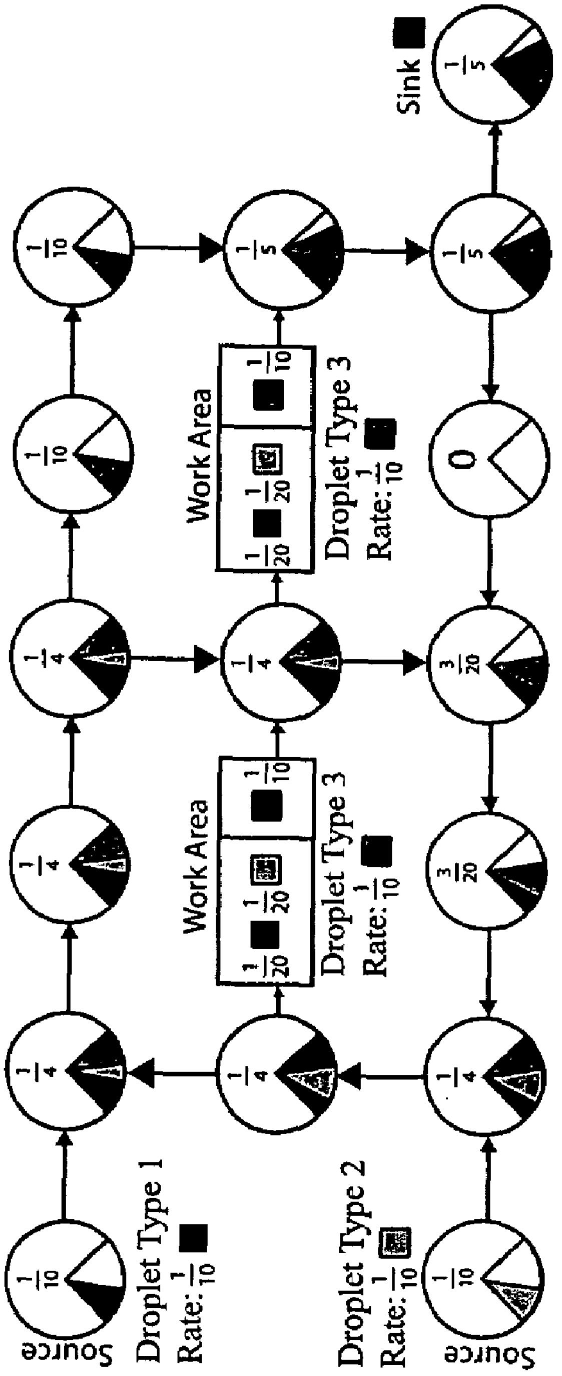
FIG. 7 illustrates an example of a component graph for an embodiment of a digital microfluidic system that utilizes the chemical analysis graph of FIG. 6.

Once the computed flow rate through the system converges for the droplet flow rate analysis of the DMFS, the component graph is analyzed. If the system is stable, the inflow rate will equal the outflow rate at every street component, connector component, work area component, and intersection component node. Otherwise, the system is likely unstable. A simplified example system with steady state flow information is depicted in FIG. 7.

Figure 8:
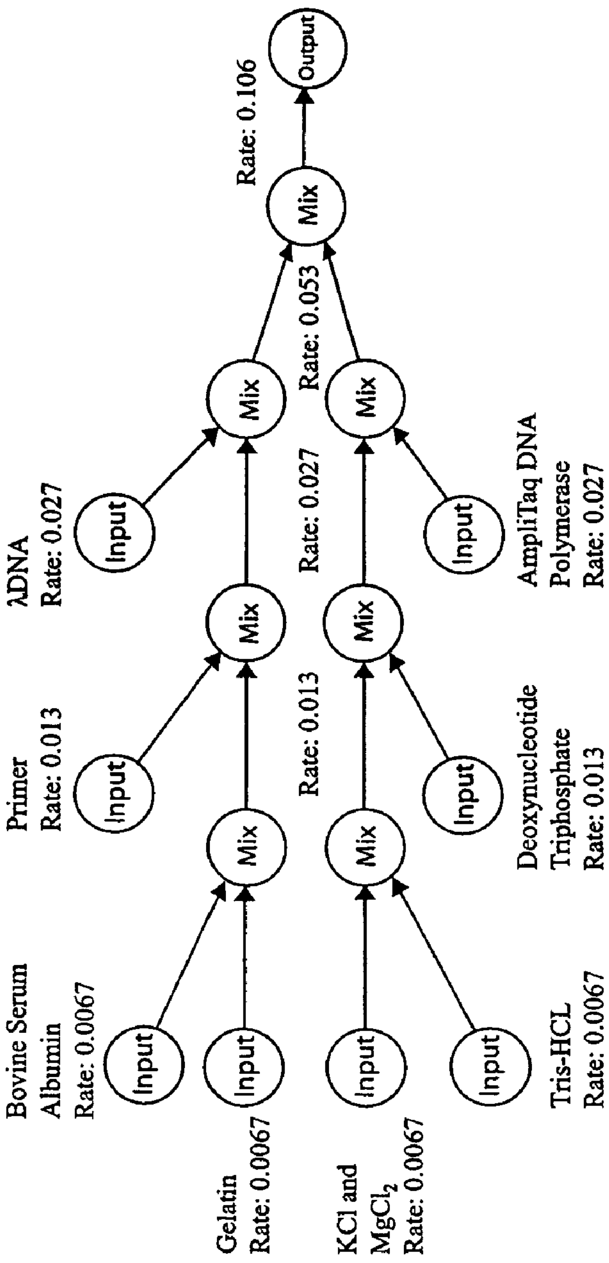
FIG. 8 illustrates an example of an analysis graph that describes a DNA polymerase chain reaction, which can be performed by an embodiment of a digital microfluidic system with controls in accordance with the present invention.

Exemplary systems operating in batch mode and in continuous mode have been modeled and simulated. One of these exemplary systems is based on DNA polymerase chain reaction operations. This reaction involves eight input chemical droplet types and seven mixing operations. FIG. 8 illustrates an analysis graph of the DNA polymerase chain reaction (PCR) analysis. Following each mixing operation, the resulting chemical droplet is split into two droplets. The DMFS array is set up with four work area components, eight source components, which each introduce an input chemical droplet type, and one sink component to collect the final product as illustrated in the embodiment of FIG. 2. The size of the DMFS array in this example is 53×41 cells. The system's operating parameters were set with the aid of the stability analysis described above. In continuous mode, the resulting digital microfluidic system has an average of 66 chemical droplets on the array, and the routing computations are performed at a rate of 7300 cycles per second. Computer simulation of a model of this DMFS performing the PCR analysis, in both batch mode and continuous mode, as well as models of other system configurations, including those running multiple chemical analyses, have demonstrated that stable operation is obtained using the system design and control method described above.

The method and system for controlling chemical reactions in a digital microfluidic system in accordance with the present invention supports the introduction of new virtual component types in addition to those described above. For example, sensing components that permit sensor monitoring of the chemical reactions and chemical analyses can be added. Also, as another example, storage components in which chemical droplets can be stored temporarily can be incorporated. Another embodiment of method and system of controlling chemical reactions can support simpler array hardware that permits only limited row-column addressing of electrodes. Moreover, automatically sequencing operations (e.g., chemical reactions comprising dilution of a reactant with another reactant) to achieve a desired droplet concentration can be incorporated as well.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claim is:

1. A computer-implemented method of controlling chemical reactions in a digital microfluidic system comprising an array of cells, the computer-implemented method comprising:

(i) automatically generating a logical partition of the cells of the digital microfluidic system array into a plurality of virtual components capable of handling droplets of reactants based on at least a physical size of the digital microfluidic system array and a list comprising at least a plurality of work area and routing function virtual components;

(ii) automatically determining a respective next cell for each of a plurality of chemical droplets located in the plurality of generated virtual components of the digital microfluidic system array, the plurality of chemical droplets comprising the droplets of reactants, wherein said determining step: (a) automatically ascertains whether at least one of the chemical droplets can be moved to a cell in a direction toward an exit of a present virtual component of the plurality of virtual components, the present virtual component comprising at least one cell in which said at least one of the chemical droplets is currently located; and (b) automatically ascertains whether an adjacent virtual component can accept said chemical droplet, the adjacent virtual component being located adjacent to said present virtual component of the plurality of virtual components; and (iii) automatically generating a control signal to induce said chemical droplet of the plurality of chemical droplets to move along the digital microfluidic system array to the respective next cell determined for said chemical droplet in the step (ii).

2. The method of claim 1, wherein the method further comprises dynamically allocating at least one virtual component of the plurality of virtual components to process an instance of a type of chemical reaction, the type being selected from at least one chemical reaction defined by a representation readable by the digital microfluidic system.

3. The method of claim 1, wherein said automatically determining step further comprises automatically selecting a destination virtual component for the chemical droplet from the plurality of virtual components if the chemical droplet is not currently assigned a destination.

4. The method of claim 3, wherein the automatically selecting selects a waiting work area virtual component if there is at least one waiting work area virtual component, the waiting work area virtual component comprising a work unit currently waiting for a requested droplet having a requested droplet type, and if the chemical droplet is the requested droplet of the requested droplet type.

5. The method of claim 3, wherein the automatically selecting chooses a work area virtual component having an empty work unit as the destination virtual component if the chemical droplet is not a requested droplet having a requested droplet type.

6. The method of claim 3, wherein a shortest path to the destination virtual component comprises the adjacent virtual component.

7. The method of claim 1, wherein the automatically generating the logical partition comprises automatically generating the logical partition of the cells of the digital microfluidic system array into the plurality of generated virtual components capable of handling droplets of reactants associated with a plurality of chemical analyses concurrently, the automatically determining automatically determines a respective next cell for each of the plurality of chemical droplets associated with the plurality of chemical analyses in the plurality of generated virtual components of the digital microfluidic system array, and the automatically generating the control signal comprises automatically generating a plurality of control signals to induce said each of the plurality of chemical droplets of the plurality of chemical droplets associated with the plurality of chemical analyses to move along the digital microfluidic system array to the plurality of respective next cells concurrently in the plurality of generated virtual components of the digital microfluidic system array.

8. The method of claim 1, wherein the automatically generating the logical partition further comprises automatically generating the logical partition based on a chemical analysis to be performed.

9. The method of claim 1, wherein the automatically generating the logical partition further comprises automatically generating the logical partition based on a plurality of chemical analyses to be performed.

10. The method of claim 1, wherein the automatically generating the logical partition further comprises automatically generating the logical partition based on a plurality of different chemical analyses to be performed.

11. The method of claim 1, wherein the virtual components comprise at least some of a street, a connector, an intersection, a source, a sink, a mixer, and a splitter.

12. The method of claim 1, wherein the automatically determining the respective next cell for the each of the plurality of chemical droplets is based on some of the generated virtual components being allocated a higher priority compared to others of the generated virtual components.

13. A system for controlling chemical reactions in a digital microfluidic system comprising an array of cells, the system comprising:

(i) a digital microfluidic system comprising an array of cells;

(ii) means for automatically generating a logical partition of the cells of the digital microfluidic system array into a plurality of virtual components capable of handling droplets of reactants based on at least a physical size of the digital microfluidic system array and a list comprising at least a plurality of work area and routing function virtual components;

(iii) means for automatically determining a respective next cell for each of a plurality of chemical droplets located in the plurality of generated virtual components of the digital microfluidic system array, the plurality of chemical droplets comprising the droplets of reactants, wherein said determining means further comprising: (a) means for automatically ascertaining whether at least one of the chemical droplets can be moved to a cell in a direction toward an exit of a present virtual component of the plurality of virtual components, the present virtual component comprising at least one cell in which said at least one of the chemical droplets is currently located; and (b) means for automatically ascertaining whether an adjacent virtual component can accept said chemical droplet, the adjacent virtual component being located adjacent to said present virtual component of the plurality of virtual components; and (iv) means for automatically generating a control signal to induce said chemical droplet of the plurality of chemical droplets to move along the digital microfluidic system array to the respective next cell determined for said chemical droplet by said means for determining.

14. The system of claim 13, wherein the system further comprises means for dynamically allocating at least one virtual component of the plurality of virtual components to process an instance of a type of chemical reaction, the type being selected from at least one chemical reaction defined by a representation readable by the digital microfluidic system.

15. The system of claim 13, wherein said means for automatically determining further comprises means for automatically selecting a destination virtual component for the chemical droplet from the plurality of virtual components if the chemical droplet is not currently assigned a destination.

16. The system of claim 15, wherein the means for automatically selecting selects a waiting work area virtual component if there is at least one waiting work area virtual component, the waiting work area virtual component comprising a work unit currently waiting for a requested droplet having a requested droplet type, and if the chemical droplet is the requested droplet of the requested droplet type.

17. The system of claim 15, wherein the means for automatically selecting chooses a work area virtual component having an empty work unit as the destination virtual component if the chemical droplet is not a requested droplet having a requested droplet type.

18. The system of claim 15, wherein a shortest path to the destination virtual component comprises the adjacent virtual component.

19. The system of claim 13, wherein the means for automatically generating the logical partition comprises means for automatically generating the logical partition of the cells of the digital microfluidic system array into the plurality of generated virtual components capable of handling droplets of reactants associated with a plurality of chemical analyses concurrently, the means for automatically determining comprises means for determining a respective next cell for each of the plurality of chemical droplets associated with the plurality of chemical analyses in the plurality of generated virtual components of the digital microfluidic system array, and the means for automatically generating the control signal comprises means for automatically generating a plurality of control signals to induce said each of the plurality of chemical droplets of the plurality of chemical droplets associated with the plurality of chemical analyses to move along the digital microfluidic system array to the plurality of respective next cells concurrently in the plurality of generated virtual components of the digital microfluidic system array.

20. The system of claim 13, wherein the means for automatically generating the logical partition further comprises means for automatically generating the logical partition based on a chemical analysis to be performed.

21. The system of claim 13, wherein the means for automatically generating the logical partition further comprises means for automatically generating the logical partition based on a plurality of chemical analyses to be performed.

22. The system of claim 13, wherein the means for automatically generating the logical partition further comprises means for automatically generating the logical partition based on a plurality of different chemical analyses to be performed.

23. The system of claim 13, wherein the virtual components comprise at least some of a street, a connector, an intersection, a source, a sink, a mixer, and a splitter.

24. The system of claim 13, wherein the means for automatically determining the respective next cell for the each of the plurality of chemical droplets, wherein said determining is based on some of the generated virtual components being allocated a higher priority compared to others of the generated virtual components.

25. A computer readable medium comprising program code means embodied therein for instructing a digital microfluidic system comprising an array of cells to perform a method of controlling chemical reactions in said digital microfluidic system, the method comprising:

(i) automatically generating a logical partition of the cells of the digital microfluidic system array into a plurality of virtual components capable of handling droplets of reactants based on at least a physical size of the digital microfluidic system array and a list comprising at least a plurality of work area and routing function virtual components;

(ii) automatically determining a respective next cell for each of a plurality of chemical droplets located in the plurality of generated virtual components of the digital microfluidic system array, the plurality of chemical droplets comprising the droplets of reactants, wherein said determining step: (a) automatically ascertains whether at least one of the chemical droplets can be moved to a cell in a direction toward an exit of a present virtual component of the plurality of virtual components, the present virtual component comprising at least one cell in which said at least one of the chemical droplets is currently located; and (b) automatically ascertains whether an adjacent virtual component can accept said chemical droplet, the adjacent virtual component being located adjacent to said present virtual component of the plurality of virtual components; and (iii) automatically generating a control signal to induce said chemical droplet of the plurality of chemical droplets to move along the digital microfluidic system array to the respective next cell determined for said chemical droplet in the step (ii).

26. The computer readable medium of claim 25, wherein the method further comprises dynamically allocating at least one virtual component of the plurality of virtual components to process an instance of a type of chemical reaction, the type being selected from at least one chemical reaction defined by a representation readable by the digital microfluidic system.

27. The computer readable medium of claim 25, wherein said automatically determining step further comprises automatically selecting a destination virtual component for the chemical droplet from the plurality of virtual components if the chemical droplet is not currently assigned a destination.

28. The computer readable medium of claim 27, wherein the automatically selecting selects a waiting work area virtual component if there is at least one waiting work area virtual component, the waiting work area virtual component comprising a work unit currently waiting for a requested droplet having a requested droplet type, and if the chemical droplet is the requested droplet of the requested droplet type.

29. The computer readable medium of claim 27, wherein the automatically selecting chooses a work area virtual component having an empty work unit as the destination virtual component if the chemical droplet is not a requested droplet having a requested droplet type.

30. The computer readable medium of claim 27, wherein a shortest path to the destination virtual component comprises the adjacent virtual component.

31. The computer readable medium of claim 25, wherein the automatically generating the logical partition comprises automatically generating the logical partition of the cells of the digital microfluidic system array into the plurality of generated virtual components capable of handling droplets of reactants associated with a plurality of chemical analyses concurrently, the automatically determining automatically determines a respective next cell for each of the plurality of chemical droplets associated with the plurality of chemical analyses in the plurality of generated virtual components of the digital microfluidic system array, and the automatically generating the control signal comprises automatically generating a plurality of control signals to induce said each of the plurality of chemical droplets of the plurality of chemical droplets associated with the plurality of chemical analyses to move along the digital microfluidic system array to the plurality of respective next cells concurrently in the plurality of generated virtual components of the digital microfluidic system array.

32. The computer readable medium of claim 25, wherein the automatically generating the logical partition further comprises automatically generating the logical partition based on a chemical analysis to be performed.

33. The computer readable medium of claim 25, wherein the automatically generating the logical partition further comprises automatically generating the logical partition based on a plurality of chemical analyses to be performed.

34. The computer readable medium of claim 25, wherein the automatically generating the logical partition further comprises automatically generating the logical partition based on a plurality of different chemical analyses to be performed.

35. The computer readable medium of claim 25, wherein the virtual components comprise at least some of a street, a connector, an intersection, a source, a sink, a mixer, and a splitter.

36. The computer readable medium of claim 25, wherein the automatically determining the respective next cell for the each of the plurality of chemical droplets is based on some of the generated virtual components being allocated a higher priority compared to others of the generated virtual components.

* * * * *